United States Patent
Wyndrum, Jr.

[15] 3,692,953

[45] Sept. 19, 1972

[54] MULTIPLEX MULTIFREQUENCY SIGNAL RECEIVER

[72] Inventor: Ralph William Wyndrum, Jr., Fair Haven, N.J.

[73] Assignee: Bell Tlephone Laboratories Incorporated, Murray Hill, N.J.

[22] Filed: Dec. 18, 1970

[21] Appl. No.: 99,421

[52] U.S. Cl. ................................179/84 VF, 328/138

[51] Int. Cl. ............................H04m 1/50, H04q 9/12

[58] Field of Search ............... 179/84 VF; 340/171 R; 328/137, 328/138, 154

[56] References Cited

UNITED STATES PATENTS

| | | | |
|---|---|---|---|
| 3,296,463 | 1/1967 | Brault | 328/138 |
| 3,288,940 | 11/1966 | Bennett | 179/84 VF |
| 3,128,349 | 4/1964 | Boesch | 179/84 VF |
| 3,223,783 | 12/1965 | Yamamoto et al. | 179/84 VF |
| 3,445,606 | 5/1969 | Brightman | 179/84 VF |

OTHER PUBLICATIONS

Dersch, " Filter Ckt.," IBM Tech. Disclosure Bulletin, Vol. 2 4 (12/59) pages 58- 59.

*Primary Examiner*—Kathleen H. Claffy
*Assistant Examiner*—William A. Helvestine
*Attorney*—R. J. Guenther and Edwin B. Cave

[57] ABSTRACT

In a multifrequency signal receiver the presence of each of $n$ possible input signal frequencies is tested, sequentially, for a time proportional to the period associated with the frequency. Testing is effected by sequentially changing the resistive magnitude $n$ times in the feedback path of an active R–C filter. The signal filter thus performs the function of $n$ conventional filters.

7 Claims, 4 Drawing Figures

INVENTOR
R. W. WYNDRUM, JR.
BY [signature]
ATTORNEY

MULTIPLEX MULTIFREQUENCY SIGNAL RECEIVER

BACKGROUND OF THE INVENTION

1. Field of the Invention

This invention relates to time multiplexing communication systems and, more particularly, to multiplex multifrequency signal receivers.

2. Description of the Prior Art

Multifrequency signal receivers are well known in the art as illustrated by L. C. J. Roscoe's U.S. Pat. No. 3,281,790, issued Oct. 25, 1966. Roscoe's receiver which is specifically designed for use in a telephone plant effects the conversion of coincident two-tone signal bursts, which may be generated by pushbutton dialing for example, into direct current signals which are then used conventionally to initiate the operation of electromechanical central office switching equipment. Another example of a prior art receiver is shown by the F. T. Boesch, D. H. Nash and L. Schenker U.S. Pat. No. 3,128,349, issued Apr. 7, 1964. Such receivers employ two complete networks, namely, a high frequency network and a low frequency network. By the use of respective band-elimination filters and limiters, all of the signal frequencies falling in the higher end of the assigned spectrum are applied as inputs to a first group of tuned circuit filters, and all of the signals falling in the lower end of the assigned spectrum are applied as inputs to a second group of tuned circuit filters. The number of filters employed is thus equal to the number of individual signal frequencies. Additionally, combinations of detectors, a timer and logic circuitry are employed so test the validity of incoming combinations of coincident two-tone bursts in order to ensure that direct current output signals are generated only in response to valid input signals.

In the manufacture of receivers of the type described above, it has been found desirable to utilize current state-of-the-art technology, including combinations of thin film and silicon chip integrated circuitry. For example, for the tuned circuit filters, a total of *n* (typically, eight) almost identical filter sections are connected in parallel, and each uses the same type of operational amplifier, and the same type of capacitor and resistor substrate topologies. The eight different signal frequencies are detected, one by each section, using the simple expedient of trim anodizing the resistor values differently for each section to identify different center frequencies.

A major concern with respect to circuits constructed in the manner above is their undue cost and complexity.

SUMMARY OF THE INVENTION

A general object of the invention is to reduce both cost and complexity in multifrequency communication receivers, particularly in multifrequency signal receivers.

The foregoing and additional objects are achieved in accordance with the principles of the invention by a unique switched analog filter structure that is time shared by each signal frequency in the assigned signal spectrum. In accordance with an important feature of the invention, the analog filter structure is made to test for each frequency for a time that is proportional to the period associated with that frequency. This arrangement ensures that the same number of cycles are sampled for each signal frequency.

Another key feature of the invention involves the structure of the filter itself. In lieu of the conventional approach that calls for the use of *n* separate and distinct filters to accommodate *n* frequencies as described above, a single filter in the form of an operational amplifier is employed in combination with switching means, a clock and suitable interconnecting logic circuitry to effect sequential switching of groups of frequency-determining resistors in the filter feedback loop of the operational amplifier. The filter in accordance with the invention thus sequentially performs the task of *n* filter sections.

In accordance with one aspect of the invention, a filter of the type described above is employed in combination with a pre-multiplex or time speed-up (TSU) system. In such a system, the frequency bands in use are in effect compressed and sampling or multiplexing rates are increased correspondingly. Substantial improvements in the efficiency of the basic signal frequency detection equipment can be realized in this manner.

The features of the invention have broader application than to a multifrequency signal receiver, the particular illustrative embodiment disclosed herein. The principles of the invention, in fact, relate to time multiplexing arrangements in general, and these principles have applicability to multiplexing message systems as well as to multiplexing signal systems.

DETAILED DESCRIPTION

Figure 1:
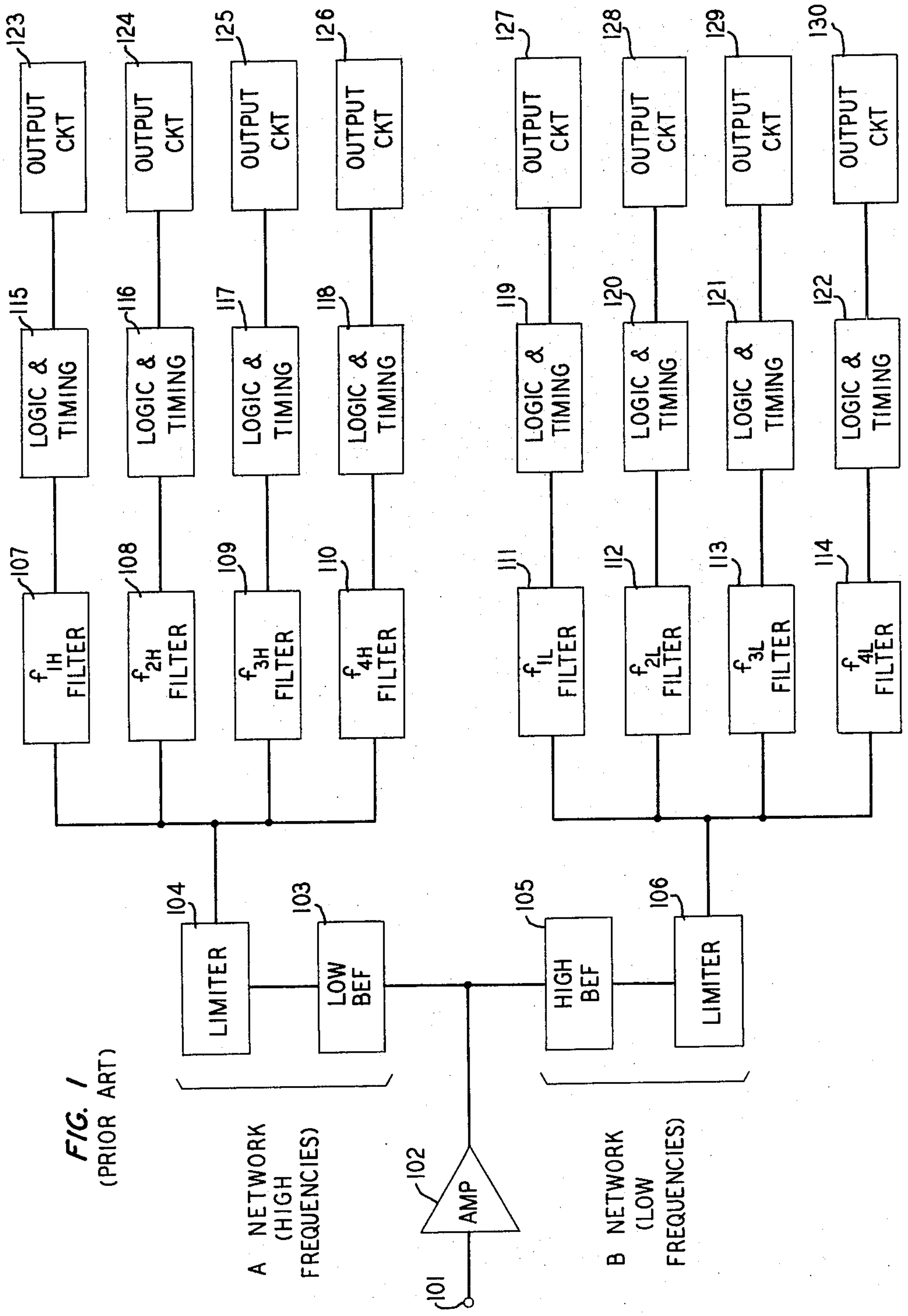
FIG. 1 (PRIOR ART)
FIG. 1 is a block diagram of a multifrequency signal receiver in accordance with the prior art.

In the prior art receiver of FIG. 1, two substantially identical networks are employed, namely: an A or high frequency network, and a B or low frequency network. Signals are introduced at input point 101 and are amplified by amplifier 102, all signals from the output of amplifier 102 being applied as inputs to band-elimination filters 103 and 105. Signals are then applied to the respective filter groups by way of limiters 104 and 106. Each of the filters 107 through 110 is tuned to pass a respective one of the signaling frequencies $f_{1H}$–$f_{4H}$ in the high frequency band, and each of the filters 111 through 114 is tuned to pass a respective one of the frequencies $f_{1L}$–$f_{4L}$ in the low frequency bank. Logic and timing circuits 115 through 118 and 119 through 122 are employed to ensure the validity of all signals which meet the frequency requirements. Energization of one of the output circuits 123 through 126 in the A network together with the energization of one of the output circuits 127 through 130 in the B network is translated into a particular digit designating signal by logic circuitry, not shown, and this information is utilized conventionally to establish a signaling and talking path through a central office switching network, not shown.

Figure 2A:
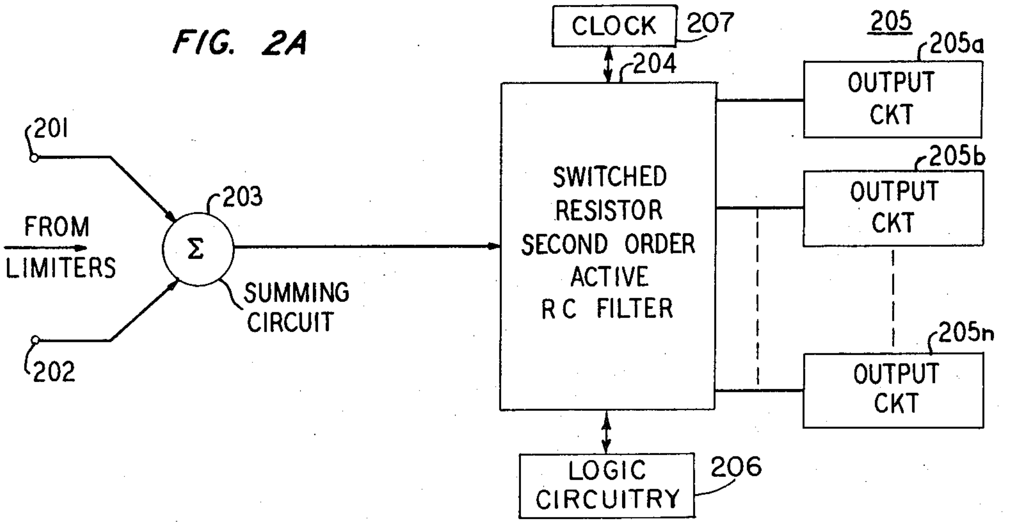
FIG. 2A is a block diagram of a multifrequency signal receiver in accordance with the invention.

Virtually the same functions performed by the prior art circuit of FIG. 1 are performed in accordance with the invention by the circuit of FIG. 2A. Signals applied from the limiters, not shown, are applied to terminals 201 and 202 and thence by way of a conventional summing circuit 203 to a switched resistor second order active R–C filter 204. The switching action of the filter 204 is controlled by an asynchronous clock 207 in combination with logic circuitry 206. An asynchronous clock is required so that the sampling time during which the filter 204 "listens" sequentially for each signal frequency is proportional to the period associated with that frequency so that in each instance a sample includes the same number of signal cycles, which may be five cycles for example. Each of the output circuits 205*a* through 205*n* includes suitable delay circuitry so that for each valid coincident signal input pair two of these output circuits registers a "1" while the other output circuits register a "0". If it is assumed that half of the available signal time, which typically is on the order of 40 milliseconds, must be used for switching and settling time, the frequencies for an eight-frequency system may be detected according to the following weighting scheme:

| | Frequencies (Hz) | Period Time (msec.) | Sample Time (msec.) |
|---|---|---|---|
| LOW | 697 | 1.43 | 3.64 |
| GROUP | 770 | 1.30 | 3.30 |
| | 852 | 1.17 | 2.97 |
| | 941 | 1.07 | 2.72 |
| HIGH | 1209 | 0.83 | 2.11 |
| GROUP | 1336 | 0.75 | 1.90 |
| | 1447 | 0.69 | 1.75 |
| | 1633 | 0.61 | 1.55 |
| | | | 19.94 msec. |

In such an arrangement all of the switches employed to insert sequentially the different combinations of frequency-determining resistances employed in the R–C filter 204 as well as the output multiplexing switches which form a part of the output circuits 205, are closed at "0", 2 × 3.64 msec., 2 × (3.64 + 3.30)msec . . . until all frequencies have been tested. The settling time between switching may be minimized by forcing "0" initial conditions which may be achieved, for example, by using switched capacitors in the filter 204 to return all outputs to an a-c ground.

Digit simulation, which may occur, for example, when two signal frequencies are generated simultaneously by speech, can be detected in accordance with the invention by suitably modifying the clock 207 and the logic 206 so that the sampling time is halved and then twice cycling through all of the frequencies. With the receiver modified in that manner, digit simulation can go undetected only if two false tones occur twice, simultaneously, approximately 20 milliseconds apart.

Figure 2B:
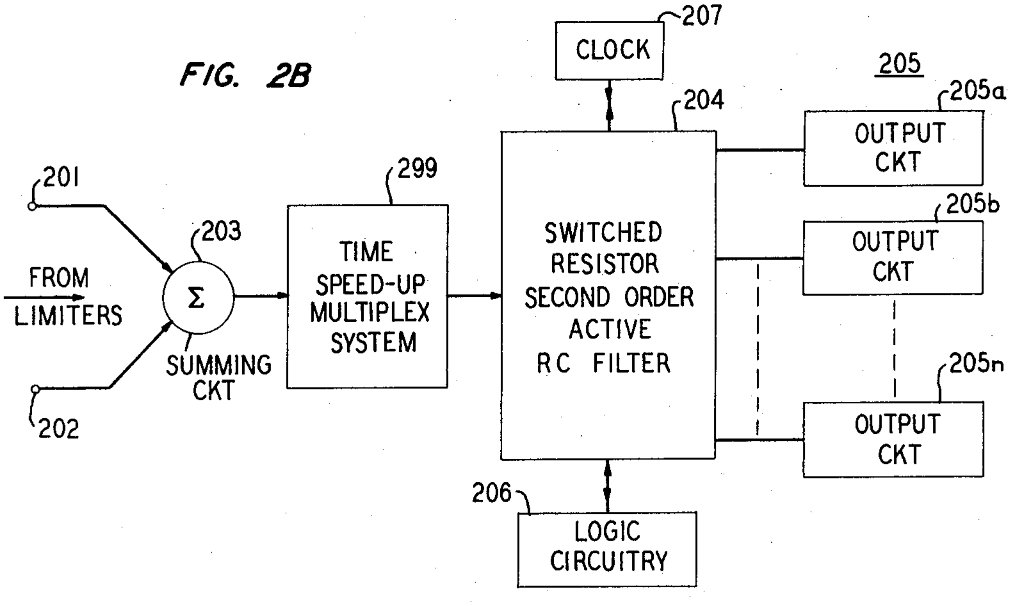
FIG. 2B is a modified version of the receiver shown in FIG. 2A.

In accordance with another form of the invention, a pre-multiplexing or time speed-up (TSU) system may be combined with the arrangement of FIG. 2A, as illustrated in FIG. 2B. A TSU system is disclosed by J. F. O'Neill in his article "Multiplex TOUCH-TONE Detection Using Time Speed-Up" published in the January 1969 issue of The Bell System Technical Journal, pgs. 249 – 254. In this type of combination circuit the input signal tones are modulated to a substantially higher frequency and multiplex switching may hence be conducted at a correspondingly higher rate. In the frequency detection portion of the circuit, the switched resistor second order active R–C filter 204 of FIG. 2B, all of the reactances are then scaled up in frequency in accordance with the magnitude of the frequency time compression ratio. The primary advantage of such a system is an increase in efficiency in the use of the receiver and attendant savings in cost. An additional significant advantage is achieved in that signal settling time is substantially reduced with the use of a TSU system. It is known that settling time in a basic receiver in accordance with the invention is proportional, approximately, to Q/3.3 Hz, where Q is the Q factor of the receiver and where 3.3 Hz is expressed in terms of duration for the signal cycles indicated. With a time speed-up arrangement it is evident therefore that the settling time required to achieve uniform output signals is correspondingly reduced.

Figure 3:
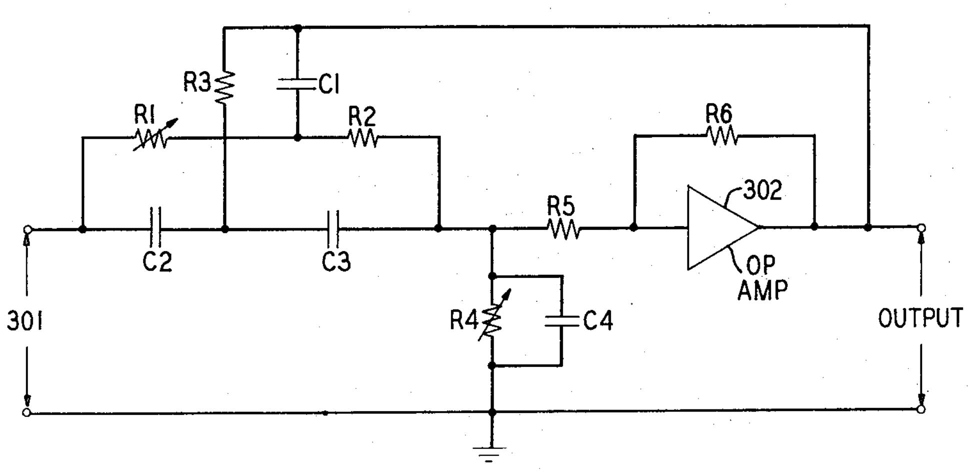
FIG. 3 is a schematic circuit diagram of a switched filter in accordance with the invention.

A schematic circuit diagram of the filter 204, shown in block form in FIGS. 2A and 2B, is shown in FIG. 3. The circuit includes an operational amplifier 302 with stabilizing negative feedback provided conventionally by resistor R6, which also sets the amplifier gain. The filter frequency is determined by a modified twin-T, R–C circuit which includes the capacitors C1, C2, C3 and C4 in combination with the resistors R1, R2, R3 and R4. Resistors R1 and R4 are shown as variable elements which in this instance is intended as a schematic representation of a group of eight resistors together with means for switching these resistors individually and sequentially in and out of the circuit during a full signal testing period. The magnitude of the R1 resistor affects both the frequency and the "Q" of the circuit, and the R4 resistor magnitude primarily determines the "Q" of the circuit. Conventional transistor switching may be used advantageously to switch the R1 and R4 groups in the manner described.

It is to be understood that the embodiment described herein is merely illustrative of the principles of the invention. Various modifications thereto may be effected by persons skilled in the art without departing from the spirit and scope of the invention.

What is claimed is:

1. In a multifrequency signal receiver, in combination, an input point to which coincident combinations of multifrequency signals are applied, each combination having a common minimum duration, a plurality of output points, means for testing said input point sequentially for the presence of each of *n* possible signal frequencies, the time of each individual test being proportional to the period for the related one of said frequencies, the total time for *n* tests being less than said duration, and means responsive to said test means for applying a signal to each of said output points that corresponds to the presence of a related one of said signal frequencies.

2. Apparatus in accordance with claim 1 wherein said testing means comprises a single filter circuit including frequency-determining elements and means for switching into and out of said filter, sequentially, selected combinations of said elements, each of said combinations corresponding to a respective one of said frequencies, whereby said single filter performs the function of *n* filters.

3. Apparatus in accordance with claim 2 wherein said filter comprises an active filter employing an operational amplifier with resistors and capacitors in a feedback path thereof.

4. Apparatus in accordance with claim 2 wherein said testing means further includes a clock circuit and logic circuitry for controlling said switching means.

5. Apparatus in accordance with claim 2 wherein said elements switched into and out of said filter comprise resistors.

6. Apparatus in accordance with claim 2 including means for pre-multiplexing said signals prior to the application of said signals to said testing means.

7. Apparatus in accordance with claim 1 in further combination with a time speed-up system whereby the frequency of said signals is increased prior to signal testing by said testing means.

* * * * *